Patented June 11, 1940

2,204,072

UNITED STATES PATENT OFFICE 2,204,072

SEPARATION OF ISOTOPES

John G. Dean, Birmingham, N. J., assignor to The Permutit Company, New York, N. Y., a corporation of Delaware No Drawing. Application May 25, 1938, Serial No. 210,084

9 Claims. (Cl. 23—1)

This invention or discovery relates to the change in ratio of isotopes; and it comprises a process wherein a solution of an electrolyte containing isotopic cations is contacted with extensive surfaces of a material possessing cation exchange properties and having a selective or preferential affinity for one or more of the isotopes and there is obtained by extraction from the exchange material a solution containing the isotopes in a ratio different from that of the original electrolyte solution; all as more fully hereinafter set forth and as claimed.

Isotopes of an element have substantially the same chemical and physical properties and it is a difficult matter to separate them. So far as there are methods of isotope separation they depend upon quite small differences; upon differences in properties more or less directly associated with the known differences in mass between isotopes of the same element. Much research has been devoted to the problem of isotope separation. Isotope separation is an outstanding problem.

In the present invention, a study of the properties of isotopes of elements forming cations of salts in aqueous solution and a knowledge of the properties of cation exchange materials led to a prediction, which has been substantiated by experiment, that there would be differences between the isotopes in the reactions known as base exchange. Apparently these differences are associated with differences in rate of reaction or chemical affinity for the base exchange material, be it one of the well known base exchange alumino-silicate zeolites, clays, or the recently developed carbonaceous zeolites. Generally one of the isotopes in an isotopic mixture of cation forming elements in solution exhibits a selective affinity for the zeolite body in ion exchange. Certain of the isotopic cations are more readily replaced than others in zeolitic materials. These discoveries have been utilized in separating the isotopes of various elements by cation exchange.

Lithium, nitrogen (ammonium) and potassium are typical cation forming elements existing in isotopic form. Lithium exists as two isotopes having respective atomic weights of 6 and 7 and designated $Li^6$ and $Li^7$. These modifications exist normally in the ratios of 1:11.6, $Li^7$ being the more abundant of the two isotopes. The salts of ammonia contain nitrogen as two isotopes of 14 and 15 atomic weight respectively, designated $N^{14}$ and $N^{15}$. The ratio in this case is about 1:248, $N^{14}$ being the more abundant. Potassium forms three isotopes, $K^{39}$, $K^{40}$ and $K^{41}$. Of these, $K^{40}$ is present in extremely small amounts. It is radio-active. The ratio of the other two is about 14.2:1, $K^{39}$ being the more abundant. In solutions of salts containing any of these three elements as cations, the isotopes exhibit different behavior in the reaction towards cation exchange zeolites. This difference is utilized in the present invention. One of the isotopic cations of any one of the three elements is taken up from solution selectively or preferentially by cation exchange zeolites.

In the case of lithium the light isotope $Li^6$ which is the rarer modification, is exchanged preferentially to the heavier $Li^7$ for another element, sodium for example, in a zeolite.

An aqueous solution of an ammonium salt containing both heavy and light nitrogen atoms, $N^{15}$ and $N^{14}$, in contact with the zeolite gives up the light ammonium ion in preference to the heavy ion.

From potassium salt solutions, there is a preferential abstraction by exchange zeolites of the heavy isotope cation, $K^{41}$.

For example, a zeolite can be charged with both the isotopes of lithium by treating the zeolite with a solution of lithium chloride containing the two in ordinary ratio. When equilibrium is established between the two phases, the ratio of $Li^7$ to $Li^6$ in the solution is increased and is correspondingly decreased in the zeolite. In other words, the $Li^6$ is held more strongly by the zeolite. This equilibrium constitutes a single step which, when repeated, effects isotopic separation.

The stated discoveries can be utilized in various procedures. In one, a body of zeolite as in the form of a column is exposed to a flow of a lithium chloride solution until a substantially greater ratio of less abundant to more abundant isotope occurs in the zeolite while the reverse action takes place as regards the liquid; the concentration of the more abundant increasing at the expense of the less abundant. When the zeolite is saturated with a foreign cation at the start of the reaction, the greatest change in ratio is observed in the first portion of the lithium-bearing solution which passes the zeolite.

After charging the zeolite with lithium isotopes they can be extracted by a regenerating solution: a solution of common salt or an acid as the case may be. The solution obtained in this extraction shows a higher concentration ratio of the less abundant $Li^6$ to the more abundant $Li^7$ than that existing in the original lithium chloride solution treated.

Similar operations effect a separation of the nitrogen isotopes as they normally occur in solutions of ammonium salts. For example, a dilute solution of ammonium chloride passed down through a column of sodium zeolite gives first an effluent solution containing only sodium chloride, and finally ammonium chloride begins to appear. The effluent containing ammonium chloride shows by measurement on a mass spectrometer an isotopic ratio of $N^{15}$ to $N^{14}$ of 1:274 compared with the normal abundance ratio of 1:248. That is, the ratio of the abundance of the rarer nitrogen isotope $N^{15}$ in the solution is decreased by 10 per cent. There is a corresponding increase in the quantity of the rarer isotope in the zeolite. To recover a solution of an ammonium salt containing the heavy nitrogen in greater than normal abundance, the zeolite is treated with a solution containing other than ammonium cations as for example with a solution of sodium chloride. A solution is thus obtained containing ammonium salt extracted from the zeolite with the rarer heavy nitrogen in greater than the normal abundance, the greatest concentration change being obtained toward the end of the regeneration.

This method of changing the ratio by simple contact between a solution of isotopic cations and suitable zeolitic surfaces can be extended to greater concentration changes by the use of suitable countercurrent processes.

Working with a potassium salt which has a normal abundance of $K^{41}$ in a ratio to $K^{39}$ of 1:14.2, one substantially complete charging of a sodium zeolite in a 35' column with potassium ions by passage of a 2 to 3 per cent potassium chloride solution followed by extraction or regeneration with sodium chloride solution (10 per cent) results in increasing the $K^{41}$ abundance ratio to 1:13.4. This is an isotope concentration change of about 5 per cent in one short passage.

A modified method of effecting isotope preferential exchange separation is repeated treatment of a solution containing isotopic cations with an exchange zeolite. The zeolite abstracts from the solution a greater proportion of one isotope than of the other. Thus a 20 per cent solution of lithium chloride repeatedly treated with a sodium zeolite until 99 per cent of the lithium is exchanged, has a normal abundance of the rare isotope $Li^6$ reduced from 1:11.6 to 1:12.7. This is a decrease of about 9 per cent in the abundance ratio.

For the preferential cation exchange of isotopes, any compound containing the cation with any anion may be used. The chloride is usually the most convenient salt, but any other salt such as sulphate, carbonate, acetate, or phosphate, etc., can be used, and the hydroxide in some cases is also suitable. For the exchange cation in the zeolite there is an equally wide latitude of choice. Sodium and calcium zeolites, also carbonaceous hydrogen zeolites with or without replacement of the acidic hydrogen by a basic cation are advantageous. In general, the zeolite may contain any cation forming element other than the isotopic cations to be separated by base exchange, except in the case in which a countercurrent process is used, and then the zeolite may contain the cation of the isotopic elements being separated.

The zeolite used for the preferential isotope exchange may be any of the known cation exchange zeolites. A good zeolite to use, for example, is a carbonaceous hydrogen zeolite made by sulfation of humic matter in lignite or soft coal and having the hydrogen replaced by sodium or calcium.

It is usually advantageous to work with dilute solutions of electrolytes. But this is not essential to the isotope separation by exchange of cations. Concentrations of the order of 2 to 3 per cent in the isotope solution are suitable. The regenerating or extracting solution may better be of a higher concentration, say 10 per cent. This gives a more concentrated solution of the separated isotope. If desired, the zeolite may be caused to move countercurrent to the flow of isotope solution, in suitable apparatus, with withdrawal of spent zeolite at one point and addition of regenerated zeolite at another point, so that more or less continuous separation is accomplished. For instance, in the stated example the liquid can be passed upwardly through the column of zeolite in the tube, and portions of the charged zeolite removed at the bottom continuously or from time to time, with corresponding replacements of fresh zeolite at the top.

What I claim is:

1. A process for changing the ratio of isotopes of an element contained in the cation of a salt which comprises contacting a solution containing such a salt with extensive surfaces of a zeolitic material having a selective affinity for an isotope of the element separating the solution from the zeolitic material, and segregating a portion of the solution containing the isotopes of the element in a changed ratio.

2. A process of changing the ratio of isotopes of an element which comprises abstracting cations from a solution containing the rare and abundant isotopes of the element as cations by contacting the solution with a cation exchange material, separating the solution from the exchange material and segregating a portion of the solution containing the rare and the abundant isotopes of the element as cations in a ratio different from that in the original solution.

3. A process of effecting a change in ratio of isotopes of cation forming elements which comprises contacting a solution containing the isotopes of an element as cations in a certain ratio with a cation exchange zeolite to charge the zeolite with said isotopic cations, subsequently contacting the charged zeolite with a second solution containing other cations, removing the second solution from the zeolite and segregating a portion of the second solution containing said isotopes in a ratio different from that of the original solution.

4. A process wherein a solution containing as cations in a certain ratio both rare and abundant isotopes of a cation forming element is passed through a column of cation exchange zeolitic material, an effluent solution is withdrawn and a portion of said effluent solution is segregated which contains different said isotopes in a ratio different from said certain ratio.

5. A process wherein a solution containing as cations in a certain ratio both rare and abundant isotopes of a cation forming element is passed through a column of cation exchange zeolitic material, an effluent solution is withdrawn and a portion of said effluent solution is segregated which contains the rare isotope in a changed ratio from that of the original solution.

6. A process of changing the ratio of isotopes in cation forming isotopic elements which comprises passing a solution containing the isotopes as cations through a column of cation-exchange material containing other cation forming elements to exchange the isotopic cations in solution for said other cations then passing a regenerating solution through said column, withdrawing the regenerating solution from the column and segregating a portion of the regenerating solution containing the isotopes in a changed ratio.

7. A process according to claim 6, wherein the isotopic element is potassium.

8. A process wherein a solution containing as cations in a certain ratio both rare and abundant isotopes of a cation forming element is passed in countercurrent to a moving body of granular cation exchange material and a portion of the effluent solution is segregated containing said isotopes in a ratio different from that of the influent solution.

9. A process for changing the normal ratio of isotopes of an element contained in the cation of a salt which comprises contacting a solution containing such salt having normal ratio of isotopes with extensive surfaces of a zeolitic material having a selective affinity for an isotope of the element, separating the solution from the zeolitic material, and segregating a portion of the solution containing isotopes of the salt in a ratio changed from the normal ratio.

JOHN G. DEAN.

CERTIFICATE OF CORRECTION.

Patent No. 2,204,072.  June 11, 1940.

JOHN G. DEAN.

It is hereby certified that error appears in the printed specification of the above numbered patent requiring correction as follows: Page 2, second column, line 61, claim 4, strike out the word "different"; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.

CERTIFICATE OF CORRECTION.

Patent No. 2,204,072. June 11, 1940.

JOHN G. DEAN.

It is hereby certified that error appears in the printed specification of the above numbered patent requiring correction as follows: Page 2, second column, line 61, claim 4, strike out the word "different"; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.